US012682720B2

(12) United States Patent
Soon et al.

(10) Patent No.: US 12,682,720 B2
(45) Date of Patent: Jul. 14, 2026

(54) ELECTRONIC GAMING MACHINE HAVING REELS THAT INCLUDE ENLARGED SYMBOLS

(71) Applicant: IGT, Las Vegas, NV (US)

(72) Inventors: Tracy Soon, Reno, NV (US); Rachel Guthrie, Carson City, NV (US); Matthew Palazzetti, Reno, NV (US); Jason Mead, Reno, NV (US)

(73) Assignee: IGT, Las Vegas, NV (US)

( * ) Notice: Subject to any disclaimer, the term of this patent is extended or adjusted under 35 U.S.C. 154(b) by 210 days.

(21) Appl. No.: 18/753,636

(22) Filed: Jun. 25, 2024

(65) Prior Publication Data

US 2025/0391230 A1 Dec. 25, 2025

(51) Int. Cl.
*G07F 17/00* (2006.01)
*G07F 17/32* (2006.01)

(52) U.S. Cl.
CPC ................................ *G07F 17/3213* (2013.01)

(58) Field of Classification Search
None
See application file for complete search history.

(56) References Cited

U.S. PATENT DOCUMENTS 4,448,419 A 5/1984 Telnaes
5,504,917 A 4/1996 Austin
5,584,764 A 12/1996 Inoue
6,375,570 B1 4/2002 Poole
6,561,900 B1 5/2003 Baerlocher et al.
6,731,313 B1 5/2004 Kaminkow et al.
6,981,635 B1 1/2006 Hughs-Baird et al.
6,988,947 B2 1/2006 Baerlocher et al.
7,074,127 B2 7/2006 Cuddy et al.
7,494,413 B2 2/2009 Singer et al.
7,526,736 B2 4/2009 Kaminkow et al.
7,695,363 B2 4/2010 Gilliland et al.
7,922,573 B2 4/2011 Baerlocher et al.
8,012,010 B2 9/2011 Wilson et al.
8,096,877 B2 1/2012 Hoffman
8,118,666 B2 * 2/2012 Nicely ................ G07F 17/3244
463/16
8,216,051 B2 7/2012 Rasmussen
8,226,468 B2 7/2012 Hoffman et al.
8,235,795 B2 8/2012 Green et al.
8,333,649 B2 12/2012 Marks et al.
8,616,953 B2 12/2013 Yi
9,076,285 B2 7/2015 Loose et al.
(Continued)

FOREIGN PATENT DOCUMENTS

CN 301941743 5/2012
TW 109306481 9/2021
WO 2009058256 A1 5/2009

OTHER PUBLICATIONS

Doodle Design Elements, https://www.istockphoto.com/vector/doodle-design-elements-gm533459733-56433692?searchscope=image%2Cfilm (Year: 2015).
(Continued)

*Primary Examiner* — Paul A D'Agostino
(74) *Attorney, Agent, or Firm* — Neal, Gerber & Eisenberg LLP

(57) ABSTRACT

A gaming system including a housing and a reel assembly including rotatable reel having a reel strip including one or more enlarged symbols.

20 Claims, 9 Drawing Sheets

(56) References Cited

U.S. PATENT DOCUMENTS

| | | | | |
|---|---|---|---|---|
| 9,098,982 | B2 * | 8/2015 | Mastropietro | G07F 17/3225 |
| 9,836,925 | B2 | 12/2017 | Vann | |
| 9,922,490 | B2 | 3/2018 | Elias et al. | |
| 10,068,432 | B2 * | 9/2018 | Wortmann | G07F 17/3265 |
| 10,192,391 | B2 * | 1/2019 | Berman | G07F 17/34 |
| 10,861,286 | B2 * | 12/2020 | Marsh | G07F 17/329 |
| 2003/0104860 | A1 * | 6/2003 | Cannon | G07F 17/3244 463/25 |
| 2006/0068873 | A1 * | 3/2006 | Gomez | G07F 17/3244 463/16 |
| 2007/0060249 | A1 * | 3/2007 | Gomez | G07F 17/32 463/16 |
| 2007/0117603 | A1 * | 5/2007 | Seelig | G07F 17/3211 463/16 |
| 2008/0108431 | A1 * | 5/2008 | Cuddy | G07F 17/3276 463/27 |
| 2008/0132322 | A1 * | 6/2008 | Yoshizawa | G07F 17/32 463/20 |
| 2008/0293478 | A1 * | 11/2008 | Anderson | G07F 17/3267 463/25 |
| 2009/0124364 | A1 * | 5/2009 | Cuddy | G07F 17/32 463/31 |
| 2009/0181754 | A1 * | 7/2009 | Plowman | G07F 17/34 463/31 |
| 2010/0151936 | A1 * | 6/2010 | Luciano, Jr. | G07F 17/323 463/25 |
| 2011/0117993 | A1 * | 5/2011 | Carlson | G07F 17/3202 463/43 |
| 2011/0201406 | A1 * | 8/2011 | Jaffe | G07F 17/34 463/21 |
| 2012/0172106 | A1 | 7/2012 | Caputo et al. | |
| 2012/0172130 | A1 * | 7/2012 | Acres | G07F 17/3258 463/42 |
| 2013/0053128 | A1 | 2/2013 | Spark-Stahl et al. | |
| 2013/0079121 | A1 * | 3/2013 | Luciano, Jr. | G07F 17/32 463/25 |
| 2013/0116032 | A1 * | 5/2013 | Lutnick | G07F 17/3279 463/25 |
| 2013/0217463 | A1 | 8/2013 | Hughes et al. | |
| 2013/0274011 | A1 * | 10/2013 | Meyer | G07F 17/3267 463/31 |
| 2014/0018146 | A1 * | 1/2014 | Zielinski | G07F 17/3267 463/20 |
| 2014/0087830 | A1 | 3/2014 | Gobe et al. | |
| 2014/0087855 | A1 * | 3/2014 | Caputo | G07F 17/3225 463/26 |
| 2014/0087861 | A1 * | 3/2014 | Basallo | G07F 17/32 463/29 |
| 2014/0094254 | A1 * | 4/2014 | Fujisawa | G07F 17/3265 463/20 |
| 2014/0274282 | A1 * | 9/2014 | Mastropietro | G07F 17/34 463/20 |
| 2014/0274288 | A1 * | 9/2014 | Hornik | G07F 17/326 463/20 |
| 2014/0302909 | A1 * | 10/2014 | Meyer | G07F 17/326 463/20 |
| 2015/0038213 | A1 * | 2/2015 | Meyer | G07F 17/34 463/20 |
| 2015/0080106 | A1 * | 3/2015 | Nauman | G07F 17/326 463/20 |
| 2015/0087378 | A1 * | 3/2015 | Louie | G07F 17/34 463/17 |
| 2015/0187175 | A1 * | 7/2015 | Friedman | G07F 17/3244 463/20 |
| 2015/0287269 | A1 * | 10/2015 | Berman | G07F 17/326 463/20 |
| 2015/0332544 | A1 * | 11/2015 | Kitamura | G07F 17/3213 463/20 |
| 2016/0104344 | A1 * | 4/2016 | Meyer | G07F 17/3258 463/20 |
| 2017/0032612 | A1 | 2/2017 | Aoki et al. | |
| 2017/0228976 | A1 * | 8/2017 | Chesworth | G07F 17/3262 |
| 2018/0068529 | A1 * | 3/2018 | Delekta | G07F 17/3262 |
| 2019/0019377 | A1 * | 1/2019 | Aoki | G07F 17/34 |
| 2019/0065744 | A1 | 2/2019 | Gaustad | |
| 2019/0073858 | A1 * | 3/2019 | Penacho | G07F 17/3267 |
| 2019/0213838 | A1 * | 7/2019 | Hemovich | G07F 17/3216 |
| 2019/0340886 | A1 * | 11/2019 | Humphrey | G07F 17/3293 |
| 2019/0361601 | A1 | 11/2019 | Le | |
| 2019/0371126 | A1 * | 12/2019 | Bolling, Jr. | G07F 17/3244 |
| 2020/0005587 | A1 * | 1/2020 | Hartl | G07F 17/3213 |
| 2020/0051373 | A1 * | 2/2020 | Meyer | G07F 17/3209 |
| 2020/0074784 | A1 * | 3/2020 | Caputo | G07F 17/3213 |
| 2020/0074785 | A1 * | 3/2020 | Uss | G07F 17/3258 |
| 2020/0098227 | A1 * | 3/2020 | Hendricks | G07F 17/34 |
| 2020/0234541 | A1 * | 7/2020 | Pierer | G07F 17/3267 |
| 2020/0267333 | A1 | 8/2020 | Li et al. | |
| 2020/0312086 | A1 * | 10/2020 | Kendall | G06F 7/588 |
| 2020/0320827 | A1 * | 10/2020 | Chan | G07F 17/3213 |
| 2020/0380827 | A1 * | 12/2020 | Sanborn | G07F 17/3213 |
| 2020/0402347 | A1 * | 12/2020 | Pierer | G07F 17/34 |
| 2021/0049869 | A1 * | 2/2021 | Chan | G07F 17/3267 |
| 2021/0104126 | A1 * | 4/2021 | Tran | G07F 17/3267 |
| 2021/0217276 | A1 * | 7/2021 | Sidoti | G07F 17/3213 |
| 2021/0241574 | A1 * | 8/2021 | Fan | G07F 17/3211 |
| 2021/0279999 | A1 * | 9/2021 | Meyer | G07F 17/3267 |
| 2021/0280013 | A1 * | 9/2021 | Davis | G07F 17/3267 |
| 2021/0304562 | A1 * | 9/2021 | Penacho | G07F 17/3262 |
| 2021/0375095 | A1 * | 12/2021 | Delekta | G07F 17/3213 |
| 2021/0375097 | A1 * | 12/2021 | Coppola | G07F 17/3213 |
| 2021/0398393 | A1 * | 12/2021 | Honeycutt | G07F 17/3244 |
| 2023/0005338 | A1 | 1/2023 | Penacho et al. | |
| 2023/0099268 | A1 * | 3/2023 | Jones | G07F 17/3213 463/20 |
| 2024/0112529 | A1 * | 4/2024 | Marsh | G07F 17/3213 |
| 2025/0391247 | A1 * | 12/2025 | Jones | G07F 17/3267 |

OTHER PUBLICATIONS

Geometric-shapes-square-circle-oval-triangle-hexagon-rectangle-star-rhombus, https://depositphotos. com/vector/geometric-shapes-square-circle-oval-triangle-hexagon-rectangle-star-rhombus-429196142. html Year: 2020).

Hand drawing an Empty Diagram, https://depositphotos.com/photo/hand-drawing-an-empty-diagram-11146169.html (Year: 2012).

Hand Drawing in a Whiteboard, https://depositphotos.com/photo/hand-drawing-in-a-whiteboard-36232367.html (Year: 2013).

Ink Oval Circle and rectangle frames grunge empty black boxes set ellipse and gm, https://www. istockphoto.com/vector/in k-oval-circle-and-rectangle-frames-g runge-empty-black-boxes-set-ellipse-and-g m 1366498933-437010171?searchscope=image%2Cfilm (Year: 2022).

Selection Artwork, https://depositphotos.com/photo/selection-artwork-9405283.html (Year: 2012).

* cited by examiner

1000

ELECTRONIC GAMING MACHINE HAVING REELS THAT INCLUDE ENLARGED SYMBOLS

CROSS-REFERENCE TO RELATED APPLICATIONS

This application is related to the following commonly owned co-pending patent application: U.S. application Ser. No. 29/949,114, entitled "GAMING MACHINE REEL STRIP,".

BACKGROUND

The present disclosure relates to electronic gaming machines having reels that include enlarged symbols.

Electronic gaming machines may include mechanical reels each having a reel strip. These mechanical reels and reel strips are often referred to as stepper reels and stepper reel strips. Stepper reel strips often include 22 stop positions along the stepper reel strip at which the mechanical reel can stop after an activation of the reel such as during a play of a game. Each of these stop positions is often called a stop. These electronic gaming machines may be configured mechanically and electronically to utilize all 22 stop positions. The stepper reel strip may include 11 non-blank symbols and 11 blank symbols. The blank symbols are indicated by the white areas between each adjacent—but spaced apart pair—of non-blank symbols. These stepper reel strips include a minimum required area that must be present for each blank symbol that is between each respective pair of non-blank symbols to clearly communicate to the player the specific stop position that the reel has landed on and thus whether the reel is displaying (or indicating) one of the non-blank symbols or one of the blank symbols. The displayed non-blank symbols and blank symbols are part of the outcome of the play of the game and are used to determine any award amounts resulting from the outcome and thus from the play of the game. Since these non-blank symbols and blank symbols are used to determine such outcomes and such award amounts, it is important that the there is a clear indication for each of the displayed non-blank symbols and blank symbols such as whether each displayed non-blank symbol and each displayed blank symbol is along a payline associated with the reels or not along a payline associated with the reels.

BRIEF SUMMARY

Various embodiments of the present disclosure are directed to an electronic gaming machine including a housing and a reel assembly supported by the housing. The reel assembly includes a rotatable reel including a reel strip, wherein the reel strip includes: a substrate; a first non-blank symbol on the substrate; a first blank symbol on the substrate adjacent to the first non-blank symbol; a second non-blank symbol on the substrate adjacent to the first blank symbol; a second blank symbol on the substrate adjacent to the second non-blank symbol; a third non-blank symbol on the substrate; an enlarged fourth non-blank symbol on the substrate adjacent to the third non-blank symbol, wherein no blank symbol is between the third non-blank symbol on the substrate and the fourth non-blank symbol on the substrate; and a fifth non-blank symbol on the substrate adjacent to the fourth blank symbol, wherein no blank symbol is between the fourth non-blank symbol on the substrate and the fifth non-blank symbol on the substrate.

Various other embodiments of the present disclosure are directed to an electronic gaming machine including a housing and a reel assembly supported by the housing. The reel assembly includes a rotatable reel including a reel strip, wherein the reel strip includes: a substrate; a first non-blank symbol on the substrate; a first blank symbol on the substrate adjacent to the first non-blank symbol; a second non-blank symbol on the substrate adjacent to the first blank symbol; a second blank symbol on the substrate adjacent to the second non-blank symbol; a third non-blank symbol on the substrate; an enlarged fourth non-blank symbol on the substrate adjacent to the third non-blank symbol, wherein no blank symbol is between the third non-blank symbol on the substrate and the fourth non-blank symbol on the substrate; a fifth non-blank symbol on the substrate adjacent to the fourth blank symbol, wherein no blank symbol is between the fourth non-blank symbol on the substrate and the fifth non-blank symbol on the substrate; a first space on the substrate between the third non-blank symbol on the substrate and the fourth non-blank symbol on the substrate adjacent, wherein no blank symbol is associated with the first space; and a second space on the substrate between the fourth non-blank symbol on the substrate and the fifth non-blank symbol on the substrate adjacent. No blank symbol is associated with the second space. The fourth non-blank symbol has a height that is greater than the height of each of the first non-blank symbol, the second non-blank symbol, the third non-blank symbol, and the fifth non-blank symbol. A top of the fourth non-blank symbol is closer to the third non-blank symbol than a top of the second non-blank symbol is to the first non-blank symbol. A bottom of the fourth non-blank symbol is closer to the fifth third non-blank symbol than a bottom of the second non-blank symbol is to the third non-blank symbol.

Various other embodiments of the present disclosure are directed to an electronic gaming machine including a housing and a reel assembly supported by the housing. The reel assembly includes a rotatable reel including a reel strip, wherein the reel strip includes: a substrate; a first non-blank symbol on the substrate, wherein a first stop position is associated with the first non-blank symbol; a first blank symbol on the substrate adjacent to the first non-blank symbol, wherein a second stop position is associated with the first blank symbol; a second non-blank symbol on the substrate adjacent to the first blank symbol, wherein a third stop position is associated with the second non-blank symbol; a second blank symbol on the substrate adjacent to the second non-blank symbol, wherein a fourth stop position is associated with the second blank symbol; a third non-blank symbol on the substrate, wherein a fifth stop position is associated with the third non-blank symbol; an enlarged fourth non-blank symbol on the substrate adjacent to the third non-blank symbol, wherein no blank symbol is between the third non-blank symbol on the substrate and the fourth non-blank symbol on the substrate, wherein a sixth stop position is associated with the fourth non-blank symbol; a fifth non-blank symbol on the substrate adjacent to the fourth blank symbol, wherein no blank symbol is between the fourth non-blank symbol on the substrate and the fifth non-blank symbol on the substrate, wherein a seventh stop position is associated with the fifth non-blank symbol; a first space on the substrate between the third non-blank symbol on the substrate and the fourth non-blank symbol on the substrate; and a second space on the substrate between the fourth non-blank symbol on the substrate and the fifth non-blank symbol on the substrate. No blank symbol is associated with the first space. No stop position is associated with the first space. No blank symbol is associated with the second space. No stop position is associated with the second space. The electronic gaming machine also includes a processor, and a memory device that stores a plurality of instructions, which when executed by the processor cause the processor to, for an activation of the reel, cause the rotatable reel to rotate, select one of the stop positions to stop the reel, cause the reel to stop at the selected stop position, wherein the processor will only cause the reel to stop at stop positions associated with the symbols on the substrate and not at the first space or the second space.

Additional features are described herein, and will be apparent from, the following Detailed Description and the Figures.

DETAILED DESCRIPTION

Various embodiments of the present disclosure are directed to gaming systems and particularly to electronic gaming machines ("EGMs"). For brevity and clarity, and unless specifically stated otherwise, the term "EGM" is used herein to refer to an electronic gaming machine (such as but not limited to an electronic slot machine). In various embodiments, the EGM includes one or more reels each including a reel strip, wherein one or more of the reel strips include(s) one or more enlarged symbols. The present disclosure provides various configurations for reel strips and methods of manufacturing such reel strips as further described below that the better enable one or more of the symbols of the reel strips to be an enlarged symbol that does not interfere with other symbols on the reels and specifically does not interfere with the indication of such symbols.

In various embodiments, the reels are physical reels and the reel strips are physical reel strips.

In various other embodiments, the reels are video reels and the reel strips are video reel strips.

Physical reels and physical reel strips are used as an example herein to explain the present disclosure, but are not meant to limit the present disclosure.

For a better understanding of the present disclosure, an example of a known electronic gaming machine is first described with reference to FIGS. 1A, 2A, 3A, and 4A. This example known electronic gaming machine is generally indicated by numeral 10. This example known EGM 10 includes a housing 12 that supports numerous components of the EGM 10 such as one or more input devices and a plurality of display devices.

Figure 1A:
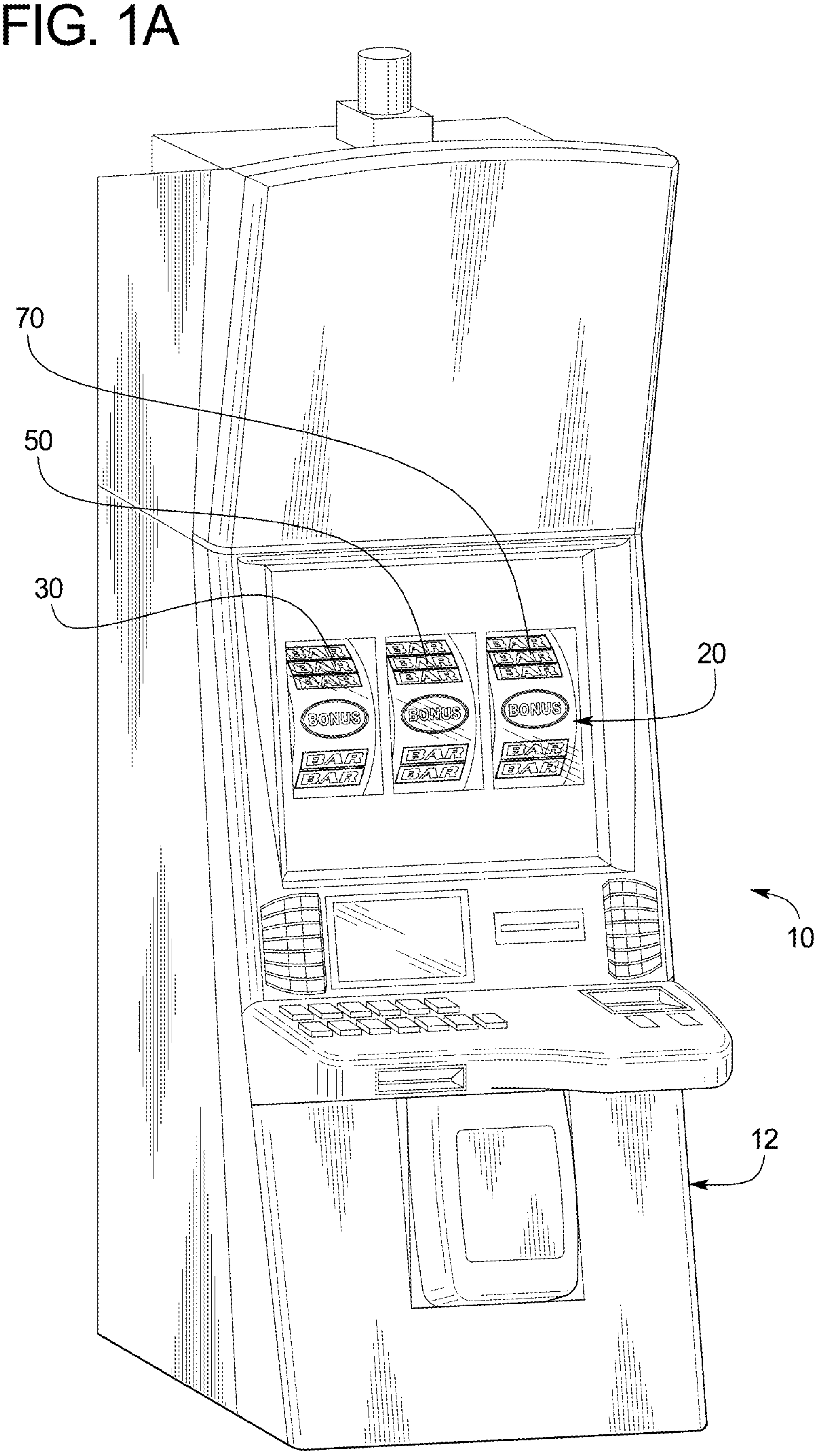
FIG. 1A is a front perspective view of an example known electronic gaming machine, and showing a physical reel assembly including a plurality of rotatable physical reels with non-blank symbols and blank symbols thereon.
Figure 1B:
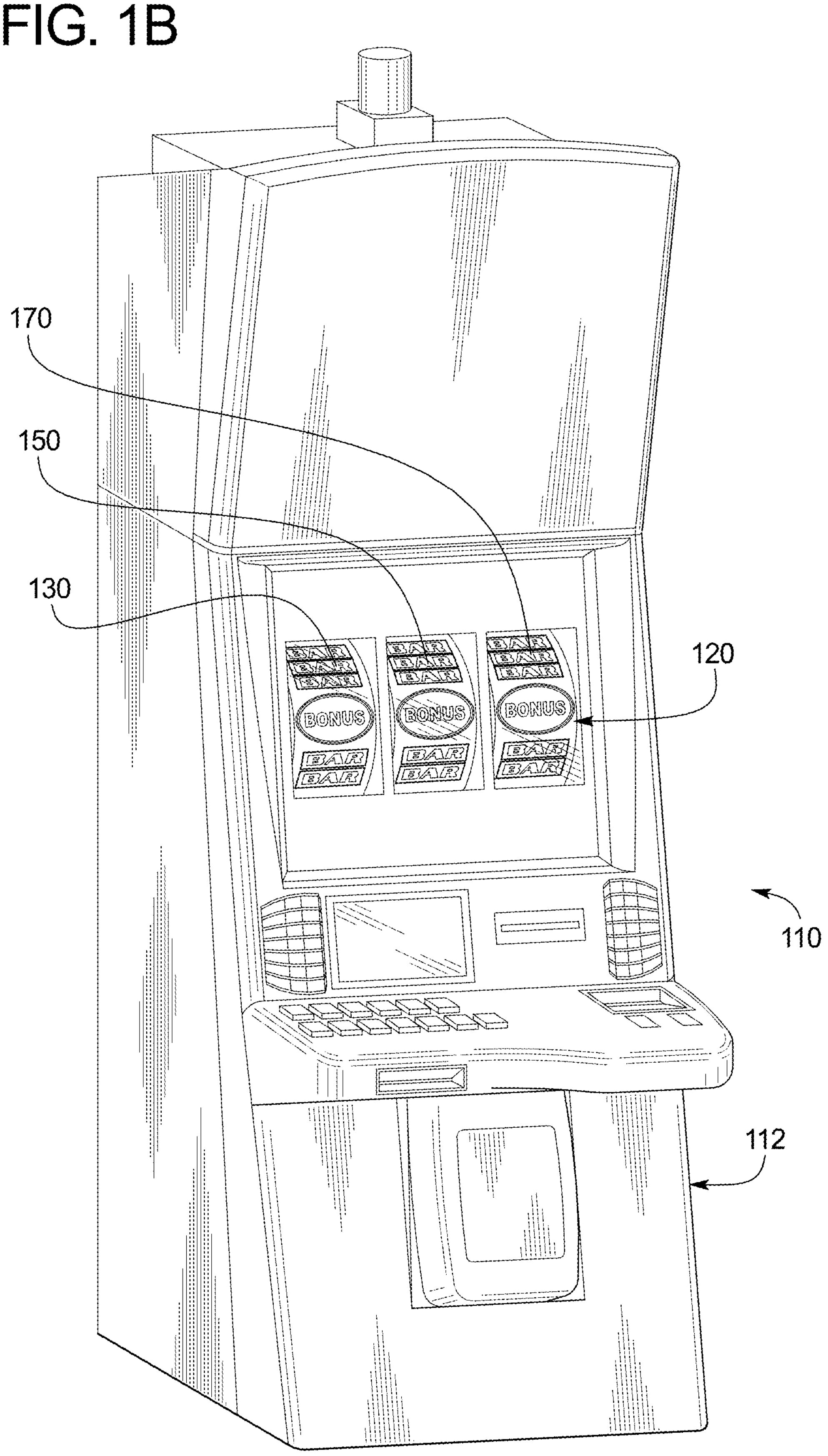
FIG. 1B is a front perspective view of an example electronic gaming machine, and showing a physical reel assembly including a plurality of rotatable physical reels with non-blank symbols and blank symbols thereon in accordance with one example embodiment of the present disclosure.
Figure 2A:
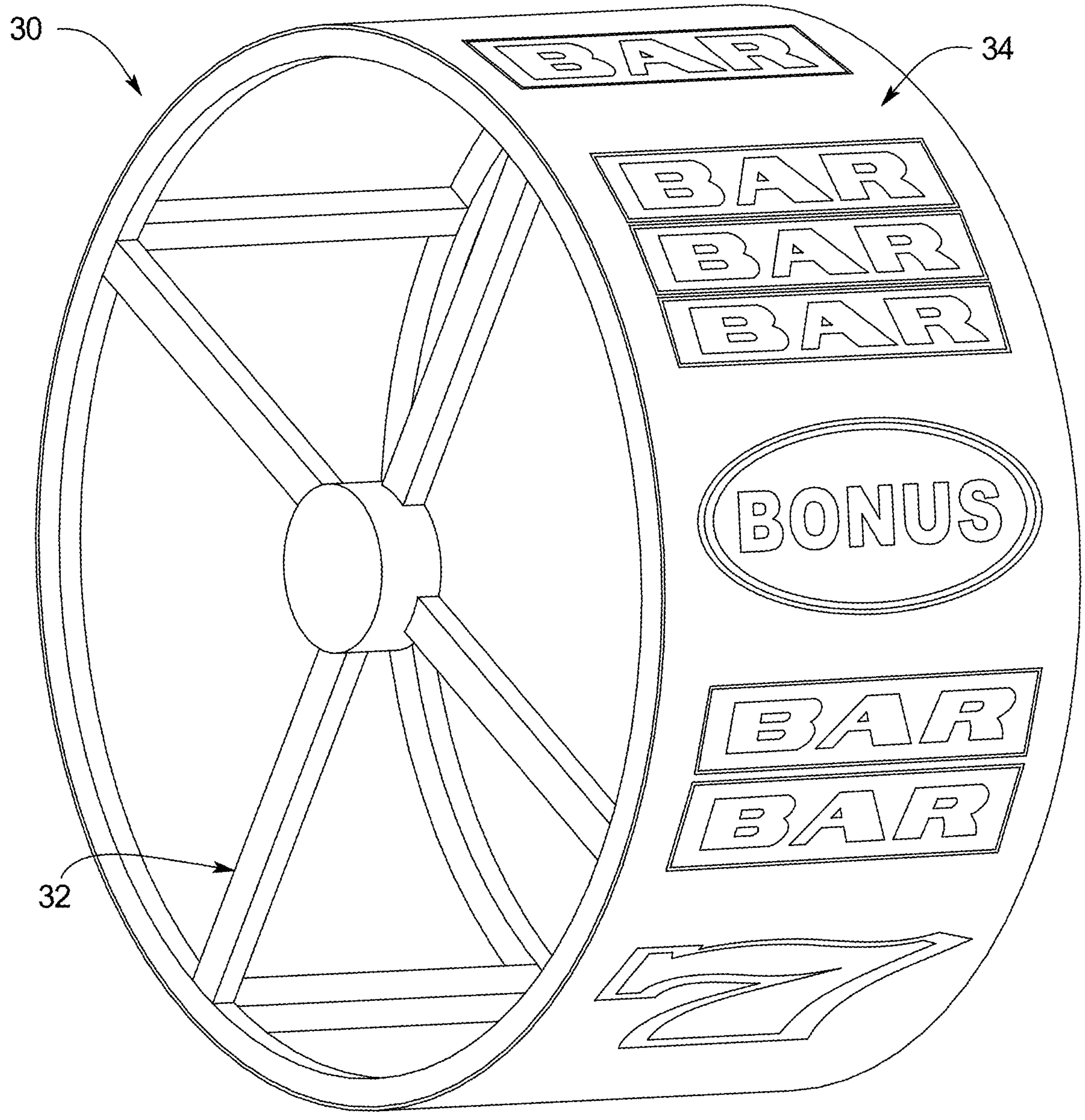
FIG. 2A is an enlarged front perspective view of one of the reels of the physical reel assembly of the example known electronic gaming machine of FIG. 1A, and showing five non-blank symbols and four blank symbols.

This EGM 10 includes a physical reel assembly 20 supported by the housing 12. The physical reel assembly 20 includes: (1) a frame assembly (not shown); (2) rotatable physical reels 30, 50, and 70 supported by the frame assembly (not shown); and (3) reel actuators (not shown) supported by the frame assembly and respectively coupled to the rotatable physical reels 30, 40, and 50. Each of the rotatable physical reels 30, 50, and 70 includes a cylindrical basket (such as basket 32) and a reel strip (such as reel strip 34) circumferentially attached to and around the cylindrical basket. Thus, as shown in FIG. 2A, the reel 30 includes a cylindrical basket 32 and a reel strip 34 attached to the basket 32.

The reel strip 34 includes 22 stop positions along the reel strip 34 at which the EGM can stop the reel 30 during a play of a game. Each of these stop positions is often called a stop. This EGM 10 is configured mechanically and electronically to utilize all 22 stop positions (such that the processor of the EGM can cause a random determination of any of the 22 stop positions for a play of the game) and cause the reel 30 to spin and stop at that randomly selected stop position to display an indicated blank symbol or non-blank symbol at that stop position). The reel strip 34 includes 11 non-blank symbols 36*a*, 36*b*, 36*c*, 36*d*, 36*e*, 36*f*, 36*g*, 36*h*, 36*i*, 36*j*, and 36*k* and 11 blank symbols 38*a*, 38*b*, 38*c*, 38*d*, 38*e*, 38*f*, 38*g*, 38*h*, 38*i*, 38*j*, and 38*k*. The reel three reel strips shown in FIG. 4A include this same symbol and reel strip configuration for each reel.

Figure 3A:
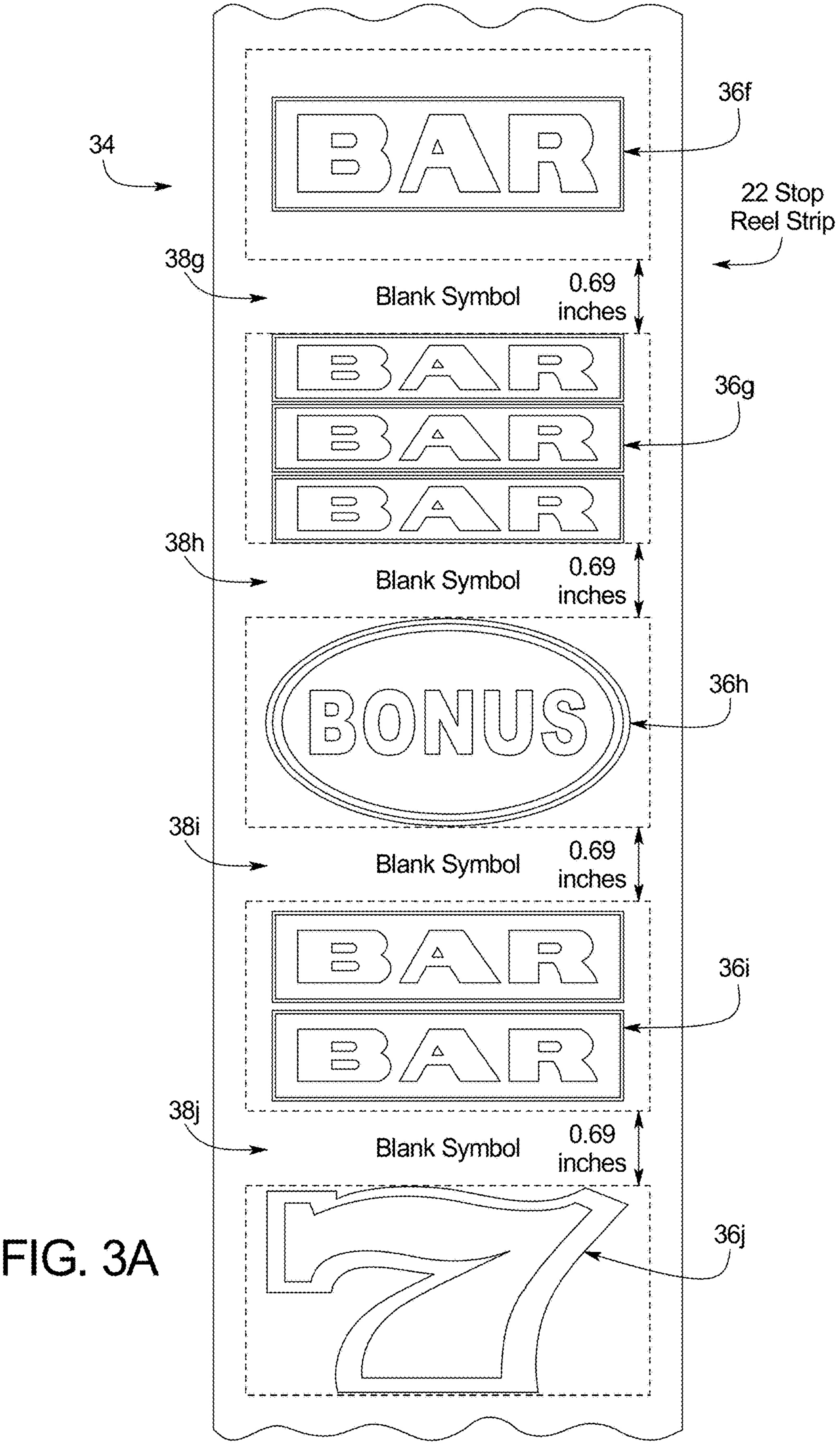
FIG. 3A is an enlarged fragmentary front view of one of the reel strips of the physical reel assembly of the example known electronic gaming machine of FIG. 1A, and showing five non-blank symbols and four blank symbols.

The blank symbols 38*a*, 38*b*, 38*c*, 38*d*, 38*e*, 38*f*, 38*g*, 38*h*, 38*i*, 38*j*, and 38*k* are respectively indicated by the white area between each spaced-apart but adjacent respective pair of non-blank symbols 36*a*, 36*b*, 36*c*, 36*d*, 36*e*, 36*f*, 36*g*, 36*h*, 36*i*, 36*j*, and 36*k*. Each of the blank symbols of the reel strip 34 is of a minimum required height (such as 0.69 inches as indicated in FIG. 3A) to clearly communicate to the player the specific respective stop position that the reel has landed on for that blank symbol and thus whether the reel is displaying and indicating one of the blank symbols. Each of the non-blank symbols of the reel strip 30 is of a maximum height (such as indicated by the phantom lines in FIGS. 3A and 4A) to clearly communicate to the player the specific stop position that the reel has landed on and thus whether the reel is displaying and indicating one of the non-blank symbols. Each displayed and indicated non-blank symbol or blank symbol is part of the outcome of the play of the game and is used to determine any award amount resulting from the outcome and thus from the play of the game. It is thus important that there is a clear indication of the respective selected displayed and indicated non-blank symbol or the respective selected displayed and indicated blank symbol.

For example, as best shown in FIG. 3A, the blank symbol 38*g* between the non-blank symbols 36*f* and 36*g* has a height of 0.69 inches to provide suitable area for the clear display and indication of the blank symbol 38*g* when that blank symbol is selected to be displayed and indicated (i.e., when the stop position associated with that blank symbol 38*g* is selected).

Likewise, as best shown in FIG. 3A, the blank symbol 38*h* between the non-blank symbols 36*g* and 36*h* has a height of 0.69 inches to provide suitable area for the clear display and indication of the blank symbol 38*h* when that blank symbol is selected to be displayed and indicated (i.e., when the stop position associated with that blank symbol 38*h* is selected).

Likewise, as best shown in FIG. 3A, the blank symbol 38*i* between the non-blank symbols 36*h* and 36*i* has a height of 0.69 inches to provide suitable space for the clear display and indication of the blank symbol 38*i* when that blank symbol is selected to be displayed and indicated (i.e., when the stop position associated with that blank symbol 38*i* is selected).

Likewise, as best shown in FIG. 3A, the blank symbol 38*j* between the non-blank symbols 36*i* and 36*j* has a height of 0.69 inches to provide suitable area for the clear display and indication of the blank symbol 38*j* when that blank symbol is selected to be displayed and indicated (i.e., when the stop position associated with that blank symbol 38*j* is selected).

Based on this configuration, there is no way to increase the size and specifically the height of one or more of the non-blank symbols on reel 34 without causing a potential issue with the potential unclear indication of one or more of the blank symbols adjacent to that non-blank symbol.

In various embodiments, the present disclosure solves this issue for each of one or more of the non-blank symbols on the reel strip by the removal of two blank symbols (including a blank symbol above the desired enlarged non-blank symbol and a blank symbol below the enlarged non-blank symbol). The present disclosure also provides for elimination of the stop positions associated with those removed blank symbols.

More specifically, referring now to FIGS. 1B, 2B, 3B, and 4B, one example embodiment of an EGM of the present disclosure is illustrated and generally indicated by numeral 110. This example EGM 110 includes a housing 112 that supports numerous components of the EGM 110 such as one or more input devices and a plurality of display devices. It should be appreciated that only certain of the components of this example EGM 110 are illustrated and described herein, and that one of ordinary skill in the art would understand the various components not illustrated or described herein. It should be appreciated that the quantity of input devices and of display devices of the EGM 110 can vary in accordance with the present disclosure.

Figure 4A:
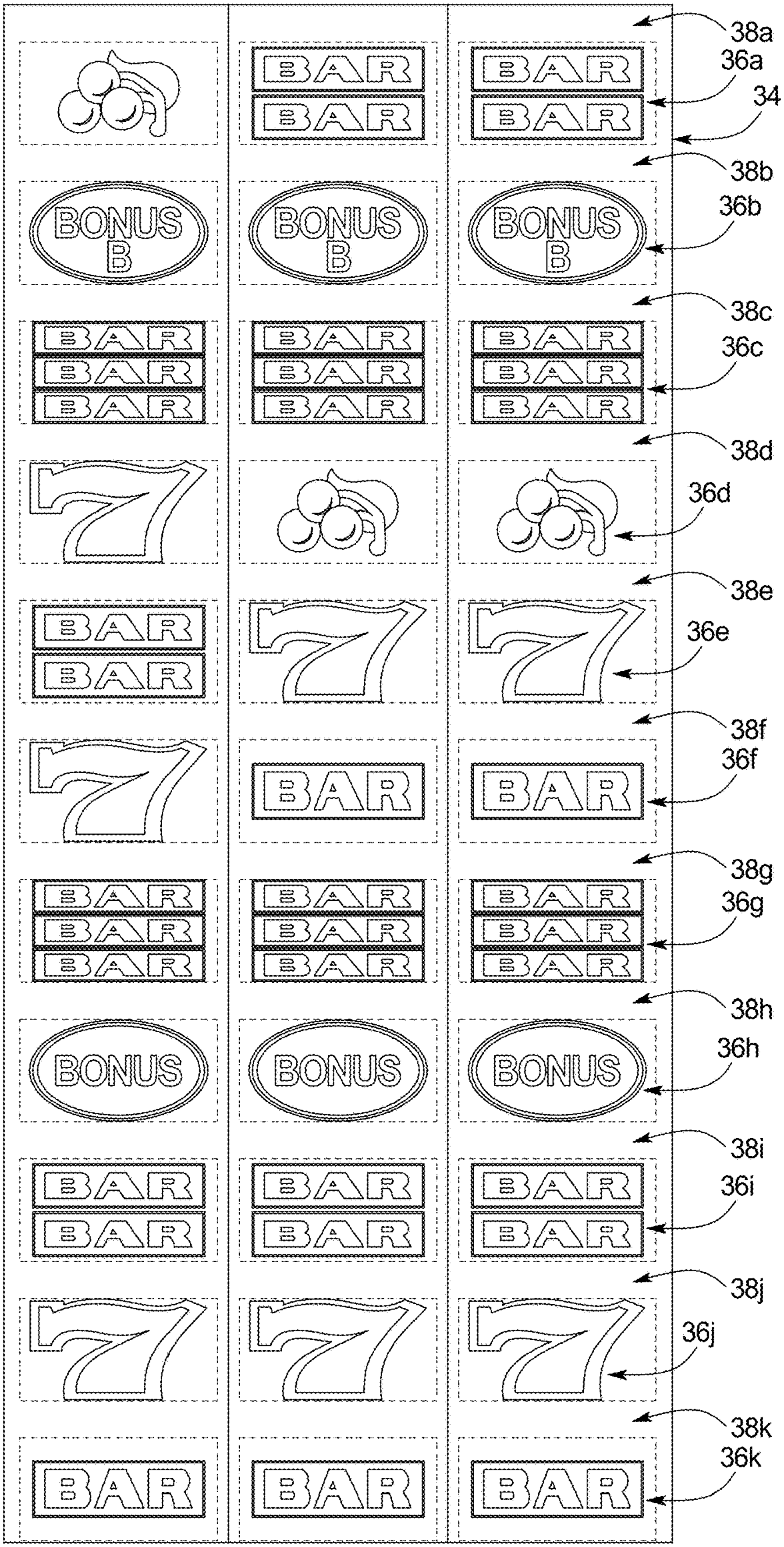
FIG. 4A is an enlarged fragmentary front view of three reel strips of the physical reel assembly of the example known electronic gaming machine of FIG. 1A, and showing each reel strip with eleven blank symbols and eleven non-blank symbols.
Figure 4B:
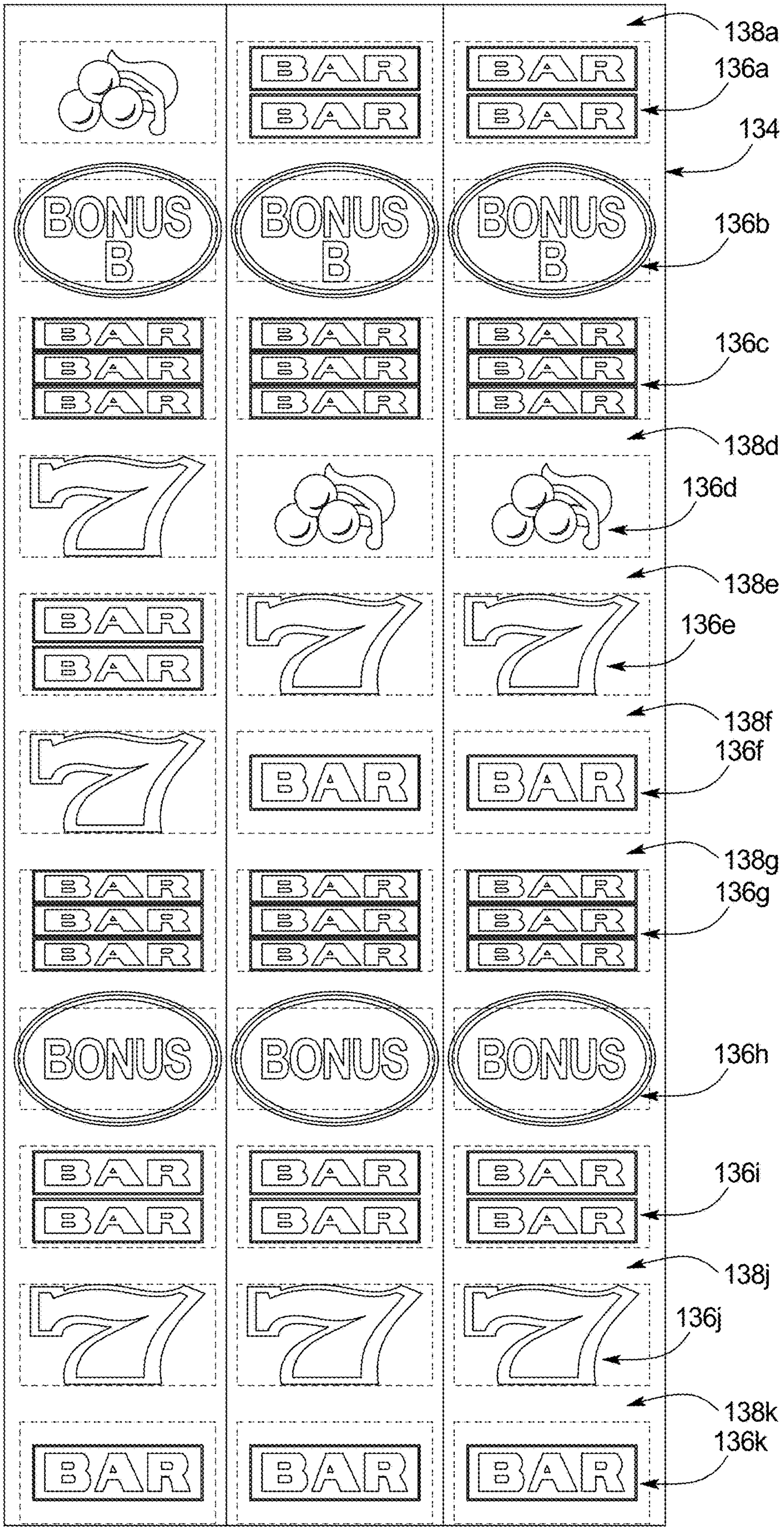
FIG. 4B is an enlarged fragmentary front view of three reel strips of the physical reel assembly of the electronic gaming machine of FIG. 1B, and showing each reel with seven blank symbols and eleven non-blank symbols, wherein two of the non-blank symbols are each enlarged symbols in accordance with one example embodiment of the present disclosure.
Figure 5:
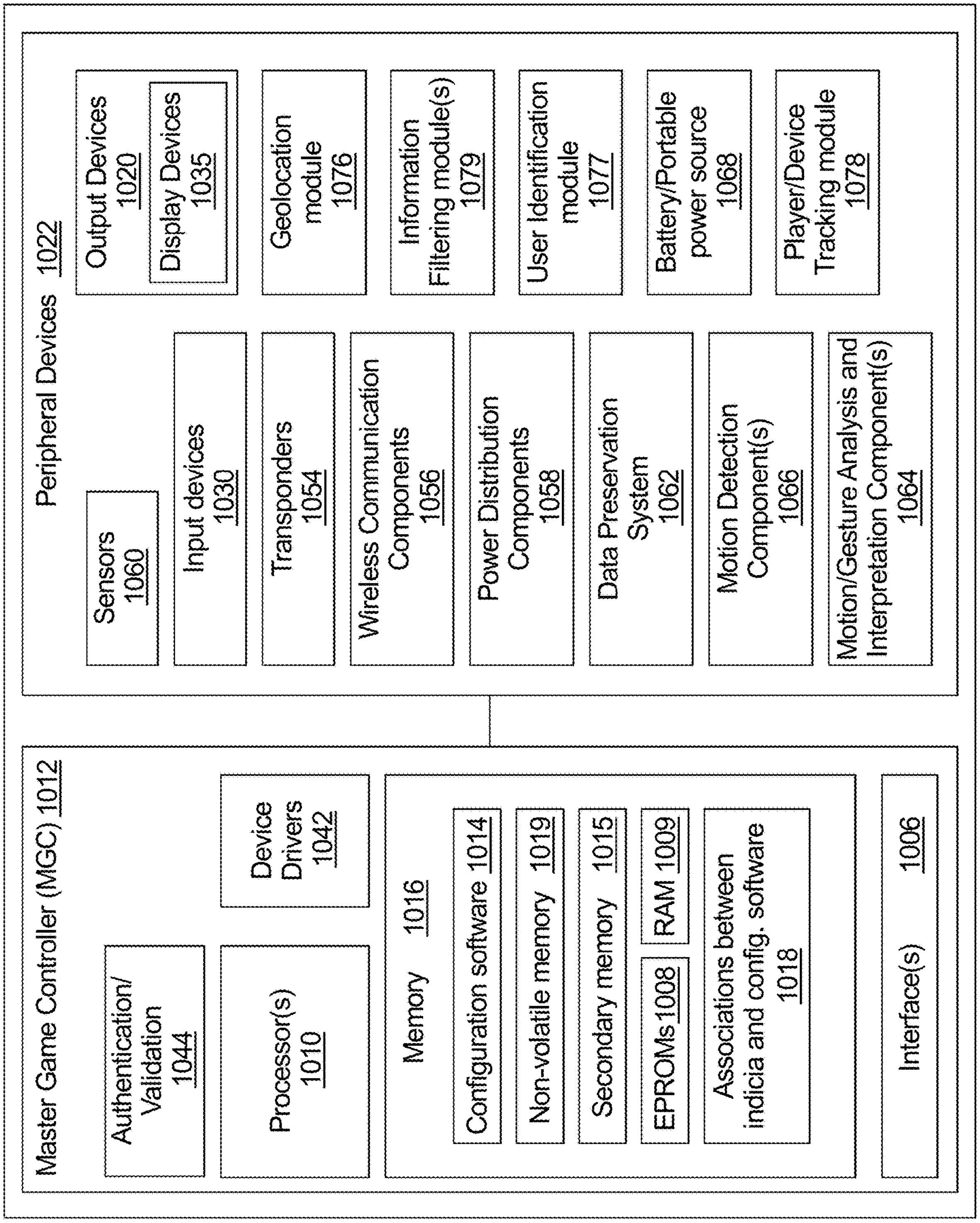
FIG. 5 is a schematic block diagram of one embodiment of an electronic configuration of an example gaming system disclosed herein.

In this illustrated example embodiment, the EGM 110 includes: (1) a processor (not shown in FIG. 1B, 2B, 3B, or 4B) and such as shown in FIG. 5; and (2) a memory device (not shown in FIG. 1B, 2B, 3B, or 4B) and such as show in FIG. 5, that stores a plurality of instructions. The plurality of instructions, when executed by the processor, cause the processor to operate with the input and display devices of the EGM 110 to provide the various functionality of the EGM 110. The plurality of instructions, when executed by the processor, cause the processor to control the movement of each of the reels 130, 150, and 170 such as further described below. The processor may be any of the processors described below, and the memory device may be any of the memory devices described below.

Figure 2B:
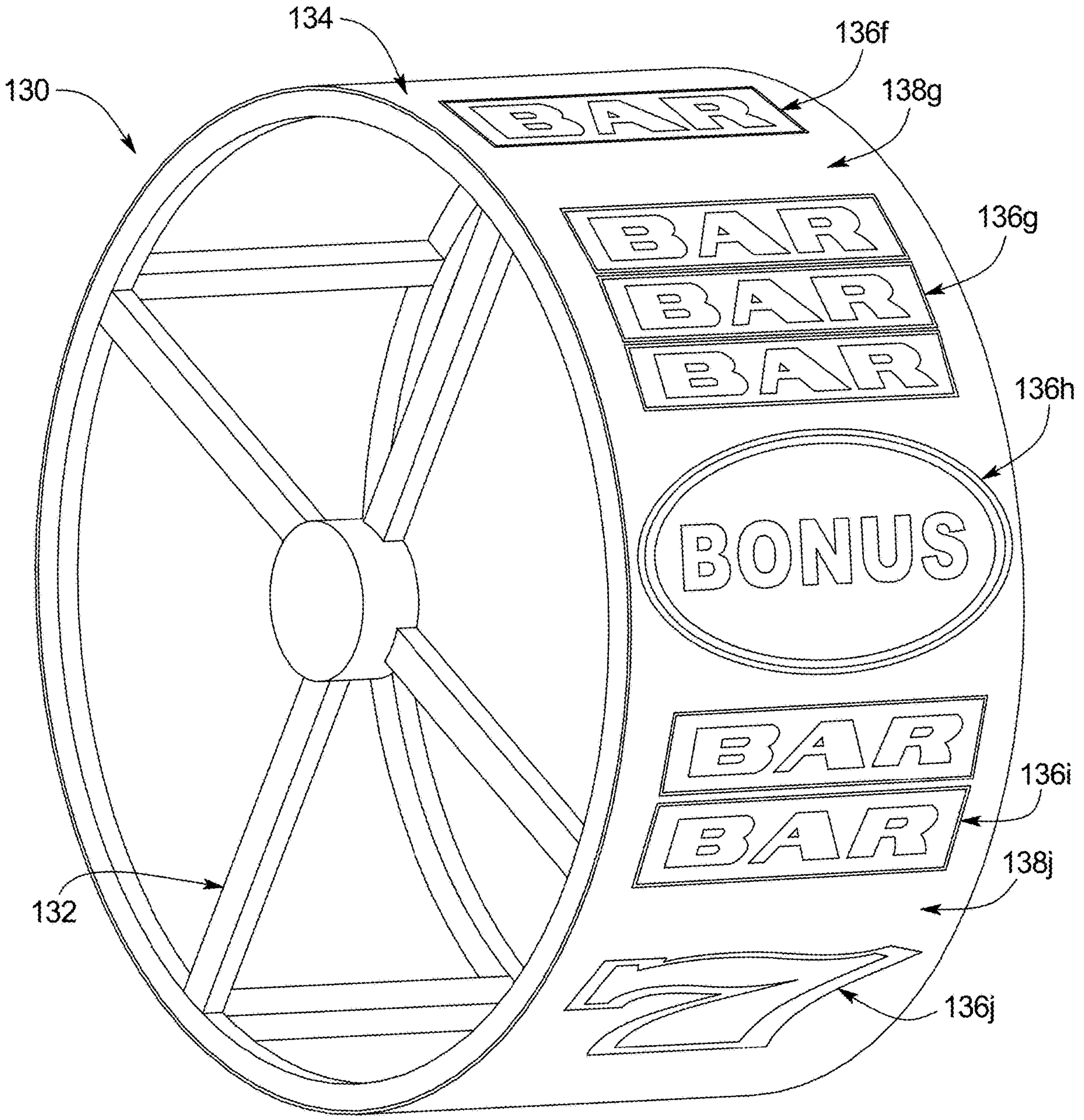
FIG. 2B is an enlarged front perspective view of one of the reels of the physical reel assembly of the electronic gaming machine of FIG. 1B, and showing five non-blank symbols and two blank symbols, wherein one of the non-blank symbols is an enlarged symbol in accordance with one example embodiment of the present disclosure.
Figure 3B:
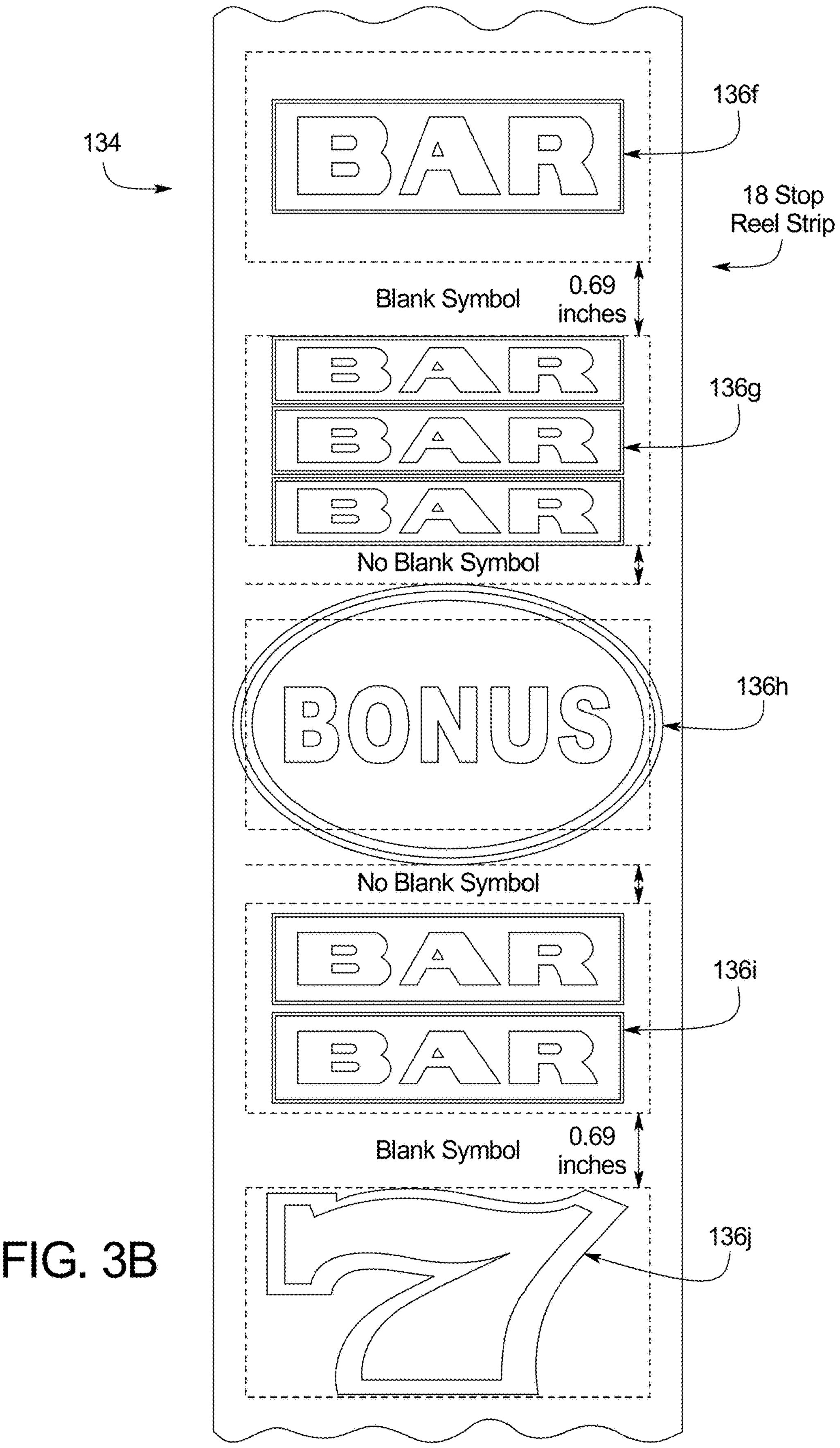
FIG. 3B is an enlarged fragmentary front view of one of the reel strips of the physical reel assembly of the electronic gaming machine of FIG. 1B, and showing five non-blank symbols and two blank symbols, wherein one of the non-blank symbols is an enlarged symbol in accordance with one example embodiment of the present disclosure.

In this illustrated example embodiment, one of the display devices include a physical reel assembly 120 suitably supported by the housing 112. In this illustrated example embodiment, the reel assembly 120 includes: (1) a suitable frame assembly (not shown); (2) a plurality of rotatable physical reels 130, 150, and 170 suitably supported by the frame assembly (not shown); and (3) a plurality of reel actuators (not shown) suitably supported by the frame assembly and respectively suitably coupled to the rotatable physical reels 130, 150, and 170. In this illustrated example embodiment, each of the rotatable physical reels 130, 150, and 170 includes a cylindrical basket and a reel strip circumferentially attached to and around the cylindrical basket. For example, as shown in FIG. 2B, the reel 130 includes a cylindrical basket 132 and a reel strip 134 suitably attached to the basket 132. Part of this reel strip 134 is shown in FIG. 3B and the entire reel strip is shown in FIG. 4B. One of the other reels strips shown in FIG. 4B is identical to the reel strip 134, and one of the other reels strips shown in FIG. 4B is different than the reel strip 134. Both such example reel strips (that are not labeled in FIG. 4B) have example enlarged symbols. Thus, it should be appreciated for any EGM, the quantity of reels and the quantity of reels with enlarged symbols can vary in accordance with the present disclosure. The three example reel strips are used for the three reels of the EGM 100 are thus not meant to limit the present disclosure.

In this example embodiment, as best shown in FIG. 4B, the reel strip 134 includes 18 stop positions (sometimes referred to as stops) along the reel strip 134 at which the EGM 110 and specifically the processor thereof can cause the reel 120 to stop at during a play of a game. The EGM 110 is configured mechanically and electronically to utilize all 18 stop positions of the reel 134.

More specifically, the reel strip 134 includes eleven non-blank symbols 136*a*, 136*b*, 136*c*, 136*d*, 136*e*, 136*f*, 136*g*, 136*h*, 136*i*, 136*j*, and 136*k*. The reel strip 134 includes seven blank symbols 138*a*, 138*d*, 138*e*, 138*f*, 138*g*, 138*j*, and 138*k*. The blank symbol 138*a* is indicated by the white area between the pair of non-blank symbols 136*k* and 136*a* on the reel strip 134. The blank symbol 138*d* is indicated by the white area between the pair of non-blank symbols 136*c* and 136*d* on the reel strip 134. The blank symbol 138*e* is indicated by the white area between the pair of non-blank symbols 136*d* and 136*e* on the reel strip 134. The blank symbol 138*f* is indicated by the white area between the pair of non-blank symbols 136*e* and 136*f* on the reel strip 134. The blank symbol 138*g* is indicated by the white area between the pair of non-blank symbols 136*f* and 136*g* on the reel strip 134. The blank symbol 138*j* is indicated by the white area between the pair of non-blank symbols 136*i* and 136*j* on the reel strip 134. The blank symbol 138*k* is indicated by the white area between the pair of non-blank symbols 136*j* and 136*k* on the reel strip 134.

The reel strip 134 does not include blank symbols (that would have respectively been labeled 138*b*, 138*c*, 138*h*, and 138*i*) to enable the non-blank symbols 136*b* and 136*h* to each be enlarged on the reel strip 134. In other words, by eliminating the blank symbols that would have respectively been labeled 138*b* and 138*c* and the respective associated stop positions for reel 130, the reel strip 134 can include the enlarged the non-blank symbol 136*b*. Likewise, by eliminating the blank symbols that would have respectively been labeled 138*h* and 138*i* and the respective associated stop positions for reel 130, the reel strip 134 can include the enlarged the non-blank symbol 136*h*.

Each of the eleven non-blank symbols and the seven blank symbols of the stepper reel strip 130 is of a minimum required space to clearly communicate to the player the specific stop position that the reel 134 has landed on for each play of the game (or for each spin and stopping of the reel), and thus whether the reel is displaying and indicating one of the respective non-blank symbols or one of the blank symbols. The displayed non-blank symbol or blank symbol is part of the outcome of the play of the game and is used to determine any award amount resulting from that outcome and thus from the play of the game. Additionally, the non-blank symbols 136*b* and 136*h* each are of a greater height and thus enlarged non-blank symbols.

For example, as best shown in FIG. 3B, the non-blank symbol 136*h* has a greater height than the non-blank symbol 36*h* (shown in FIG. 3A), the blank symbol between the non-blank symbols 136*g* and 136*h* has been eliminated, and the blank symbol between the non-blank symbols 136*h* and 136*i* has been eliminated. In this example, the height of the non-blank symbol 136*h* is 2.767 inches (but in other embodiments is as high as 2.99 inches), the height of space between the non-blank symbol 136*h* and the non-blank symbol 136*g* is 0.35 inches (but in other embodiments is as low as 0.25 inches), the height of space between the non-blank symbol 136*h* and the non-blank symbol 136*i* is 0.35 inches (but in other embodiments is as low as 0.25 inches).

The reel stop positions associated with the eliminated bank symbols have also been eliminated such that the processor cannot select those stop positions, and the processor will not cause the reel 130 to stop as those eliminated stop positions.

It should be appreciated that while the blank symbols are eliminated, substantially smaller (in height) suitable white spaces are still provided between each enlarged non-blank symbol and the adjacent non-blank symbol. For example, the reel 130 and the reel strip 134 includes: (1) a first space between non-blank symbol 136*a* and the enlarged blank symbol 136*b* but no reel stop position associated with this first space; (2) a second space between non-blank symbol 136*c* and the enlarged blank symbol 136*b* but no reel stop position associated with this second space; (3) a third space between non-blank symbol 136*g* and the enlarged blank symbol 136*h* but no reel stop position associated with this third space; and (4) a fourth space between non-blank symbol 136*i* and the enlarged blank symbol 136*h* but no reel stop position associated with this fourth space.

In various embodiments, any suitable non-blank symbol can be the enlarged symbol. In various embodiments, one or more or each of the reel strips can include one or more enlarged non-blank symbols. In various embodiments, a jackpot, bonus, or bonus trigger symbol can be the enlarged non-blank symbol. In the illustrated example embodiment, the two enlarged symbols are bonus trigger symbols 136*b* and 136*h*, and the enlargement of these non-blank symbols enhances the display and indication of the triggering of a bonus event such as secondary game. The enlargement of one or more of these non-blank symbols also adds to the player anticipation of obtaining these non-blank symbols.

In the illustrated embodiment, for each of the enlarged non-blank symbols 136*b* and 136*h*, two blank symbols and two stop position are eliminated for such blank symbol (for a total of four blank symbols and four stops eliminated).

In this example embodiment, the enlarged non-blank symbols 136*b* and 136*h*, will either directly stop and be center on a payline or they will miss the payline entirely (i.e., will not be slightly above or slightly below the payline).

In other embodiments, only one blank symbol is eliminated for each enlarged non-blank symbol to provide space for that enlarged non-blank symbol on the reel strip. In such embodiments, the enlarged non-blank symbol will not be enlarged as much as in the embodiments where both blank symbols above and below the enlarged symbol are eliminated.

The present disclosure also contemplates, for each reel and reel strip that has one or more enlarged non-blank symbols and thus has eliminated one or more blank symbols, that the plurality of instructions that are executed by the process to select stop positions for each activation of each reel are changed to take into account the lower quantity of stop positions. The stop positions can also be suitably weighted to provide the desired probabilities of each symbol being displayed and indicated in each play of the game. This includes a modification or configuration of the game math to ensure that the reels and the reel strips with the enlarged symbols will not stop at any of the eliminated stop positions.

In various embodiments, using this type of reel strip configuration, there is no need for a minimum sized blank space requirement between oversized non-blank symbols and the symbols directly above or below it.

In various embodiments, the EGM can include a transmissive display device supported by the housing in a position in front of the physical reel assembly 120. The transmissive display device can define a suitable quantity of (such as three) see-through windows that respectively correspond with and are respectively aligned with the quantity of reels such as three rotatable physical reels 130, 150, and 170. The see-through windows respectively enable a player to look through the transmissive display device to see the physical reels and the symbols on those physical reels. The transmissive display device also includes various image display areas (not labeled) adjacent to and around the three see-through windows that are generally not see-through so that a player cannot see through such adjacent areas. The transmissive display device, under the control of the processor, is configured to display various images in the various image display areas adjacent to and around the three see-through windows. The transmissive display device, under the control of the processor, is also configured to display various images at the stop positions of (i.e., in) the windows. The images displayed by the transmissive display device can be static images or changing images (such as video images). The transmissive display device can be any suitable transmissive display device such as but not limited to an LED or LCD transmissive display device.

It should also be appreciated that the various embodiments of the present disclosure each provide specific enhancements and technical improvements to EGMs, specifically including but not limited to improved reels and reel strips that can be part of primary games, secondary games, attract modes, or otherwise.

It should be appreciated from the above that various embodiments of the present disclosure provide an electronic gaming machine comprising: a housing; a reel assembly supported by the housing, the reel assembly comprising a rotatable reel comprising a reel strip, the reel strip comprising: a substrate; a first non-blank symbol on the substrate; a first blank symbol on the substrate adjacent to the first non-blank symbol; a second non-blank symbol on the substrate adjacent to the first blank symbol; a second blank symbol on the substrate adjacent to the second non-blank symbol; a third non-blank symbol on the substrate; an enlarged fourth non-blank symbol on the substrate adjacent to the third non-blank symbol, wherein no blank symbol is between the third non-blank symbol on the substrate and the fourth non-blank symbol on the substrate; and a fifth non-blank symbol on the substrate adjacent to the fourth blank symbol, wherein no blank symbol is between the fourth non-blank symbol on the substrate and the fifth non-blank symbol on the substrate. In various such embodiments, the reel strip comprises a first space on the substrate between the third non-blank symbol on the substrate and the fourth non-blank symbol on the substrate adjacent, wherein no blank symbol is associated with the first space. In various such embodiments, the reel strip comprises a second space on the substrate between the fourth non-blank symbol on the substrate and the fifth non-blank symbol on the substrate adjacent, wherein no blank symbol is associated with the second space. In various such embodiments, the reel strip comprises: a sixth non-blank symbol on the substrate; an enlarged seventh non-blank symbol on the substrate adjacent to the sixth non-blank symbol, wherein no blank symbol is between the sixth non-blank symbol on the substrate and the seventh non-blank symbol on the substrate; and an eighth non-blank symbol on the substrate adjacent to the seventh blank symbol, wherein no blank symbol is between the seventh non-blank symbol on the substrate and the eight non-blank symbol on the substrate. In various such embodiments, the reel strip comprises: a first space on the substrate between the third non-blank symbol on the substrate and the fourth non-blank symbol on the substrate adjacent, wherein no blank symbol is associated with the first space; a second space on the substrate between the fourth non-blank symbol on the substrate and the fifth non-blank symbol on the substrate adjacent, wherein no blank symbol is associated with the second space; a third space on the substrate between the sixth non-blank symbol on the substrate and the seventh non-blank symbol on the substrate adjacent, wherein no blank symbol is associated with the third space; and a fourth space on the substrate between the seventh non-blank symbol on the substrate and the eighth non-blank symbol on the substrate adjacent, wherein no blank symbol is associated with the fourth space. In various such embodiments, the seventh non-blank symbol on the substrate and the fourth non-blank symbol are a same symbol. In various such embodiments, the fourth non-blank symbol has a height that is greater than the height of each of the first non-blank symbol, the second non-blank symbol, the third non-blank symbol, and the fifth non-blank symbol. In various such embodiments, a top of the fourth non-blank symbol is closer to the third non-blank symbol than a top of the second non-blank symbol is to the first non-blank symbol, and wherein a bottom of the fourth non-blank symbol is closer to the fifth third non-blank symbol than a bottom of the second non-blank symbol is to the third non-blank symbol.

It should further be appreciated from the above that various embodiments of the present disclosure provide an electronic gaming machine comprising: a housing; a reel assembly supported by the housing, the reel assembly comprising a rotatable reel comprising a reel strip, the reel strip comprising: a substrate; a first non-blank symbol on the substrate; a first blank symbol on the substrate adjacent to the first non-blank symbol; a second non-blank symbol on the substrate adjacent to the first blank symbol; a second blank symbol on the substrate adjacent to the second non-blank symbol; a third non-blank symbol on the substrate; an enlarged fourth non-blank symbol on the substrate adjacent to the third non-blank symbol, wherein no blank symbol is between the third non-blank symbol on the substrate and the fourth non-blank symbol on the substrate; a fifth non-blank symbol on the substrate adjacent to the fourth blank symbol, wherein no blank symbol is between the fourth non-blank symbol on the substrate and the fifth non-blank symbol on the substrate; a first space on the substrate between the third non-blank symbol on the substrate and the fourth non-blank symbol on the substrate, wherein no blank symbol is associated with the first space; and a second space on the substrate between the fourth non-blank symbol on the substrate and the fifth non-blank symbol on the substrate, wherein no blank symbol is associated with the second space, wherein the fourth non-blank symbol has a height that is greater than the height of each of the first non-blank symbol, the second non-blank symbol, the third non-blank symbol, and the fifth non-blank symbol, wherein a top of the fourth non-blank symbol is closer to the third non-blank symbol than a top of the second non-blank symbol is to the first non-blank symbol, and wherein a bottom of the fourth non-blank symbol is closer to the fifth third non-blank symbol than a bottom of the second non-blank symbol is to the third non-blank symbol. In various such embodiments, the reel strip comprises: sixth non-blank symbol on the substrate; an enlarged seventh non-blank symbol on the substrate adjacent to the sixth non-blank symbol, wherein no blank symbol is between the sixth non-blank symbol on the substrate and the seventh non-blank symbol on the substrate; and an eighth non-blank symbol on the substrate adjacent to the seventh non-blank symbol, wherein no blank symbol is between the seventh non-blank symbol on the substrate and the eight non-blank symbol on the substrate. In various such embodiments, the reel strip comprises: a first space on the substrate between the third non-blank symbol on the substrate and the fourth non-blank symbol on the substrate adjacent, wherein no blank symbol is associated with the first space; a second space on the substrate between the fourth non-blank symbol on the substrate and the fifth non-blank symbol on the substrate adjacent, wherein no blank symbol is associated with the second space; a third space on the substrate between the sixth non-blank symbol on the substrate and the seventh non-blank symbol on the substrate adjacent, wherein no blank symbol is associated with the third space; and a fourth space on the substrate between the seventh non-blank symbol on the substrate and the eighth non-blank symbol on the substrate adjacent, wherein no blank symbol is associated with the fourth space. In various such embodiments, the seventh non-blank symbol on the substrate and the fourth non-blank symbol are a same symbol.

It should further be appreciated from the above that various embodiments of the present disclosure provide an electronic gaming machine comprising: a housing; a reel assembly supported by the housing, the reel assembly comprising a rotatable reel comprising a reel strip, the reel strip comprising: a substrate; a first non-blank symbol on the substrate, wherein a first stop position is associated with the first non-blank symbol; a first blank symbol on the substrate adjacent to the first non-blank symbol, wherein a second stop position is associated with the first blank symbol; a second non-blank symbol on the substrate adjacent to the first blank symbol, wherein a third stop position is associated with the second non-blank symbol; a second blank symbol on the substrate adjacent to the second non-blank symbol, wherein a fourth stop position is associated with the second blank symbol; a third non-blank symbol on the substrate, wherein a fifth stop position is associated with the third non-blank symbol; an enlarged fourth non-blank symbol on the substrate adjacent to the third non-blank symbol, wherein no blank symbol is between the third non-blank symbol on the substrate and the fourth non-blank symbol on the substrate, wherein a sixth stop position is associated with the fourth non-blank symbol; a fifth non-blank symbol on the substrate adjacent to the fourth blank symbol, wherein no blank symbol is between the fourth non-blank symbol on the substrate and the fifth non-blank symbol on the substrate, wherein a seventh stop position is associated with the fifth non-blank symbol; a first space on the substrate between the third non-blank symbol on the substrate and the fourth non-blank symbol on the substrate, wherein no blank symbol is associated with the first space, wherein no stop position is associated with the first space; and a second space on the substrate between the fourth non-blank symbol on the substrate and the fifth non-blank symbol on the substrate, wherein no blank symbol is associated with the second space, wherein no stop position is associated with the second space. The electronic gaming machine also includes a processor and a memory device that stores a plurality of instructions, which when executed by the processor cause the processor to, for an activation of the reel, cause the rotatable reel to rotate, select one of the stop positions to stop the reel, cause the reel to stop at the selected stop position, wherein the processor will only cause the reel to stop at stop positions associated with the symbols on the substrate and not at the first space or the second space. In various such embodiments, the reel strip comprises: a sixth non-blank symbol on the substrate, wherein an eight stop position is associated with the sixth non-blank symbol; an enlarged seventh non-blank symbol on the substrate adjacent to the sixth non-blank symbol, wherein no blank symbol is between the sixth non-blank symbol on the substrate and the seventh non-blank symbol on the substrate, wherein a ninth stop position is associated with the seventh non-blank symbol; and an eighth non-blank symbol on the substrate adjacent to the seventh blank symbol, wherein no blank symbol is between the seventh non-blank symbol on the substrate and the eight non-blank symbol on the substrate, wherein a tenth stop position is associated with the eighth non-blank symbol. In various such embodiments, the reel strip comprises: a third space on the substrate between the sixth non-blank symbol on the substrate and the seventh non-blank symbol on the substrate adjacent, wherein no blank symbol is associated with the third space, wherein no stop position is associated with the third space; and a fourth space on the substrate between the seventh non-blank symbol on the substrate and the eighth non-blank symbol on the substrate adjacent, wherein no blank symbol is associated with the third space, wherein no stop position is associated with the fourth space. In various such embodiments, the seventh non-blank symbol on the substrate and the fourth non-blank symbol are a same symbol. In various such embodiments, the fourth non-blank symbol has a height that is greater than the height of each of the first non-blank symbol, the second non-blank symbol, the third non-blank symbol, and the fifth non-blank symbol. In various such embodiments, a top of the fourth non-blank symbol is closer to the third non-blank symbol than a top of the second non-blank symbol is to the first non-blank symbol, and wherein a bottom of the fourth non-blank symbol is closer to the fifth third non-blank symbol than a bottom of the second non-blank symbol is to the third non-blank symbol. In various such embodiments, the plurality of instructions, when executed by the processor cause the processor to not stop at the first space. In various such embodiments, the plurality of instructions, when executed by the processor cause the processor to not stop at the second space.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A “gaming system” as used herein refers to various configurations of: (a) one or more central servers, central controllers, or remote hosts configured to operate with one or more EGMs; and/or (b) one or more stand-alone EGMs. In other words, in various embodiments, the gaming system of the present disclosure includes: (a) one or more electronic gaming machines in combination with one or more central servers, central controllers, or remote hosts; (b) a single electronic gaming machine; or (c) a plurality of electronic gaming machines in combination with one another.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM in combination with a central server, central controller, or remote host, the central server, central controller, or remote host is any suitable computing device (such as a server) that includes at least one processor and at least one memory device or data storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. one, more than one, or each of the functions of the central server, central controller, or remote host may be performed by the at least one processor of the EGM. Further, one, more than one, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM, are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client). In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. In certain embodiments in which the data network is a WAN, the gaming system includes a central server, central controller, or remote host and an EGM, each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

It should be appreciated that FIGS. 1 and 8 include example EGMs 10 and 1000, and different EGMs may be implemented using different combinations of the components described below but not shown.

In these embodiments, the EGM includes a master gaming controller configured to communicate with and to operate with a plurality of peripheral devices.

The master gaming controller includes at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface of the master gaming controller; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices (such as input/output devices); and/or (5) controlling the peripheral devices. In certain embodiments, one or more components of the master gaming controller (such as the at least one processor) reside within a housing of the EGM (described below), while in other embodiments at least one component of the master gaming controller resides outside of the housing of the EGM.

The master gaming controller also includes at least one memory device, which includes: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device resides within the housing of the EGM (described below), while in other embodiments at least one component of the at least one memory device resides outside of the housing of the EGM.

The at least one memory device is configured to store, for example: (1) configuration software, such as all the parameters and settings for a game playable on the EGM; (2) associations between configuration indicia read from an EGM with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller communicates with other devices using a serial communication protocol. A few non-limiting examples of serial communication protocols that other devices, such as peripherals (e.g., a bill validator or a ticket printer), may use to communicate with the master game controller include USB, RS-232, and Netplex (a proprietary protocol developed by IGT).

In certain embodiments, the at least one memory device is configured to store program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The at least one memory device also stores a plurality of device drivers. Examples of different types of device drivers include device drivers for EGM components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device can be upgraded as needed. For instance, when the at least one memory device is a hard drive, new games, new game options, new parameters, new settings for existing parameters, new settings for new parameters, new device drivers, and new communication protocols can be uploaded to the at least one memory device from the master game controller or from some other external device. As another example, when the at least one memory device includes a CD/DVD drive including a CD/DVD configured to store game options, parameters, and settings, the software stored in the at least one memory device can be upgraded by replacing a first CD/DVD with a second CD/DVD. In yet another example, when the at least one memory device uses flash memory or EPROM units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device also stores authentication and/or validation components configured to authenticate/validate specified EGM components and/or information, such as hardware components, software components, firmware components, peripheral device components, user input device components, information received from one or more user input devices, information stored in the at least one memory device, etc. Examples of various authentication and/or validation components are described in U.S. Pat. No. 6,620,047, entitled "Electronic Gaming Apparatus Having Authentication Data Sets."

In certain embodiments, the peripheral devices include several device interfaces, such as: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one player/device tracking module; and (14) at least one information filtering module.

The at least one output device includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 10 illustrated in FIG. 1 includes a central display device, a player tracking display, a credit display, and a bet display.

In various embodiments, one or more of the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more keno grids, one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method". In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 10 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device may include any suitable device that enables an input signal to be produced and received by the at least one processor of the EGM.

In one embodiment, the at least one input device includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof.

In one embodiment, the at least one input device includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). one such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. In other embodiments, the EGM begins game play automatically upon appropriate funding rather than upon utilization of the game play activation device.

In other embodiments, the at least one input device includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance.

In various embodiments, the at least one input device includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick).

In certain embodiments, the at least one input device includes a touch-screen coupled to a touch-screen controller or other touch-sensitive display overlay to enable interaction with any images displayed on a display device (as described below). one such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device includes a card reader in communication with the at least one processor of the EGM. The card reader is configured to read a player identification card inserted into the card reader.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component is configured to distribute power to one or more internal components of the EGM, such as one or more rechargeable power sources (e.g., rechargeable batteries) located at the EGM.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component is configured to detect or sense one or more events and/or conditions that, for example, may result in damage to the EGM and/or that may result in loss of information associated with the EGM. Additionally, the data preservation system may be operable to initiate one or more appropriate action(s) in response to the detection of such events/conditions.

The at least one motion/gesture analysis and interpretation component is configured to analyze and/or interpret information relating to detected player movements and/or gestures to determine appropriate player input information relating to the detected player movements and/or gestures. For example, in one embodiment, the at least one motion/gesture analysis and interpretation component is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source enables the EGM to operate in a mobile environment. For example, in one embodiment, the EGM includes one or more rechargeable batteries.

The at least one geolocation module is configured to acquire geolocation information from one or more remote sources and use the acquired geolocation information to determine information relating to a relative and/or absolute position of the EGM. For example, in one implementation, the at least one geolocation module is configured to receive GPS signal information for use in determining the position or location of the EGM. In another implementation, the at least one geolocation module is configured to receive multiple wireless signals from multiple remote devices (e.g., EGMs, servers, wireless access points, etc.) and use the signal information to compute position/location information relating to the position or location of the EGM.

The at least one user identification module is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGM 10 illustrated in FIG. 1, the EGM has a housing that provides support for a plurality of the input devices and the output devices of the EGM. Further, the EGM is configured such that a player may operate it while standing or sitting.

In various embodiments, the EGM is positioned on a base or stand, or is configured as a pub-style tabletop game (not shown) that a player may operate typically while sitting. Different example EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a keno-type game, the gaming system includes one or more keno boards in either an electromechanical form or in a video form. Each keno board displays a plurality of indicia or symbols, such as numbers, letters, or other images that typically correspond to a theme associated with the gaming system.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the gaming system provides credits or other awards for one or more plays of one or more secondary games. The secondary game typically enables an award to be obtained in addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments' entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity."

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network server to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents in a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The claims are as follows:

1. An electronic gaming machine comprising:
- a housing;
- a reel assembly supported by the housing, the reel assembly comprising a rotatable reel comprising a reel strip, the reel strip comprising:
  - a substrate;
  - a first non-blank symbol on the substrate;
  - a first blank symbol on the substrate adjacent to the first non-blank symbol;
  - a second non-blank symbol on the substrate adjacent to the first blank symbol;
  - a second blank symbol on the substrate adjacent to the second non-blank symbol;
  - a third non-blank symbol on the substrate;
  - an enlarged fourth non-blank symbol on the substrate adjacent to the third non-blank symbol, wherein no blank symbol is between the third non-blank symbol on the substrate and the fourth non-blank symbol on the substrate; and
  - a fifth non-blank symbol on the substrate adjacent to the fourth blank symbol, wherein no blank symbol is between the fourth non-blank symbol on the substrate and the fifth non-blank symbol on the substrate.

2. The electronic gaming machine of claim 1, wherein the reel strip comprises a first space on the substrate between the third non-blank symbol on the substrate and the fourth non-blank symbol on the substrate adjacent, wherein no blank symbol is associated with the first space.

3. The electronic gaming machine of claim 2, wherein the reel strip comprises a second space on the substrate between the fourth non-blank symbol on the substrate and the fifth non-blank symbol on the substrate adjacent, wherein no blank symbol is associated with the second space.

4. The electronic gaming machine of claim 1, wherein the reel strip comprises
- a sixth non-blank symbol on the substrate;
- an enlarged seventh non-blank symbol on the substrate adjacent to the sixth non-blank symbol, wherein no blank symbol is between the sixth non-blank symbol on the substrate and the seventh non-blank symbol on the substrate; and
- an eighth non-blank symbol on the substrate adjacent to the seventh blank symbol, wherein no blank symbol is between the seventh non-blank symbol on the substrate and the eight non-blank symbol on the substrate.

5. The electronic gaming machine of claim 4, wherein the reel strip comprises:
- a first space on the substrate between the third non-blank symbol on the substrate and the fourth non-blank symbol on the substrate adjacent, wherein no blank symbol is associated with the first space;
- a second space on the substrate between the fourth non-blank symbol on the substrate and the fifth non-blank symbol on the substrate adjacent, wherein no blank symbol is associated with the second space;
- a third space on the substrate between the sixth non-blank symbol on the substrate and the seventh non-blank symbol on the substrate adjacent, wherein no blank symbol is associated with the third space; and
- a fourth space on the substrate between the seventh non-blank symbol on the substrate and the eighth non-blank symbol on the substrate adjacent, wherein no blank symbol is associated with the fourth space.

6. The electronic gaming machine of claim 4, wherein the seventh non-blank symbol on the substrate and the fourth non-blank symbol are a same symbol.

7. The electronic gaming machine of claim 1, wherein the fourth non-blank symbol has a height that is greater than the height of each of the first non-blank symbol, the second non-blank symbol, the third non-blank symbol, and the fifth non-blank symbol.

8. The electronic gaming machine of claim 1, wherein a top of the fourth non-blank symbol is closer to the third non-blank symbol than a top of the second non-blank symbol is to the first non-blank symbol, and wherein a bottom of the fourth non-blank symbol is closer to the fifth third non-blank symbol than a bottom of the second non-blank symbol is to the third non-blank symbol.

9. An electronic gaming machine comprising:
- a housing;
- a reel assembly supported by the housing, the reel assembly comprising a rotatable reel comprising a reel strip, the reel strip comprising:
  - a substrate;
  - a first non-blank symbol on the substrate;
  - a first blank symbol on the substrate adjacent to the first non-blank symbol;
  - a second non-blank symbol on the substrate adjacent to the first blank symbol;
  - a second blank symbol on the substrate adjacent to the second non-blank symbol;
  - a third non-blank symbol on the substrate;
  - an enlarged fourth non-blank symbol on the substrate adjacent to the third non-blank symbol, wherein no blank symbol is between the third non-blank symbol on the substrate and the fourth non-blank symbol on the substrate;
  - a fifth non-blank symbol on the substrate adjacent to the fourth blank symbol, wherein no blank symbol is between the fourth non-blank symbol on the substrate and the fifth non-blank symbol on the substrate;
  - a first space on the substrate between the third non-blank symbol on the substrate and the fourth non-blank symbol on the substrate adjacent, wherein no blank symbol is associated with the first space; and
  - a second space on the substrate between the fourth non-blank symbol on the substrate and the fifth non-blank symbol on the substrate adjacent, wherein no blank symbol is associated with the second space,
  - wherein the fourth non-blank symbol has a height that is greater than the height of each of the first non-blank symbol, the second non-blank symbol, the third non-blank symbol, and the fifth non-blank symbol,
  - wherein a top of the fourth non-blank symbol is closer to the third non-blank symbol than a top of the second non-blank symbol is to the first non-blank symbol, and wherein a bottom of the fourth non-blank symbol is closer to the fifth third non-blank symbol than a bottom of the second non-blank symbol is to the third non-blank symbol.

10. The electronic gaming machine of claim 9, wherein the reel strip comprises:

a sixth non-blank symbol on the substrate;

an enlarged seventh non-blank symbol on the substrate adjacent to the sixth non-blank symbol, wherein no blank symbol is between the sixth non-blank symbol on the substrate and the seventh non-blank symbol on the substrate; and an eighth non-blank symbol on the substrate adjacent to the seventh non-blank symbol, wherein no blank symbol is between the seventh non-blank symbol on the substrate and the eight non-blank symbol on the substrate.

11. The electronic gaming machine of claim 10, wherein the reel strip comprises:

a first space on the substrate between the third non-blank symbol on the substrate and the fourth non-blank symbol on the substrate adjacent, wherein no blank symbol is associated with the first space;

a second space on the substrate between the fourth non-blank symbol on the substrate and the fifth non-blank symbol on the substrate adjacent, wherein no blank symbol is associated with the second space;

a third space on the substrate between the sixth non-blank symbol on the substrate and the seventh non-blank symbol on the substrate adjacent, wherein no blank symbol is associated with the third space; and a fourth space on the substrate between the seventh non-blank symbol on the substrate and the eighth non-blank symbol on the substrate adjacent, wherein no blank symbol is associated with the fourth space.

12. The electronic gaming machine of claim 11, wherein the seventh non-blank symbol on the substrate and the fourth non-blank symbol are a same symbol.

13. An electronic gaming machine comprising:

a housing;

a reel assembly supported by the housing, the reel assembly comprising a rotatable reel comprising a reel strip, the reel strip comprising:

a substrate;

a first non-blank symbol on the substrate, wherein a first stop position is associated with the first non-blank symbol;

a first blank symbol on the substrate adjacent to the first non-blank symbol, wherein a second stop position is associated with the first blank symbol;

a second non-blank symbol on the substrate adjacent to the first blank symbol, wherein a third stop position is associated with the second non-blank symbol;

a second blank symbol on the substrate adjacent to the second non-blank symbol, wherein a fourth stop position is associated with the second blank symbol;

a third non-blank symbol on the substrate, wherein a fifth stop position is associated with the third non-blank symbol;

an enlarged fourth non-blank symbol on the substrate adjacent to the third non-blank symbol, wherein no blank symbol is between the third non-blank symbol on the substrate and the fourth non-blank symbol on the substrate, wherein a sixth stop position is associated with the fourth non-blank symbol;

a fifth non-blank symbol on the substrate adjacent to the fourth blank symbol, wherein no blank symbol is between the fourth non-blank symbol on the substrate and the fifth non-blank symbol on the substrate, wherein a seventh stop position is associated with the fifth non-blank symbol;

a first space on the substrate between the third non-blank symbol on the substrate and the fourth non-blank symbol on the substrate, wherein no blank symbol is associated with the first space, wherein no stop position is associated with the first space;

a second space on the substrate between the fourth non-blank symbol on the substrate and the fifth non-blank symbol on the substrate, wherein no blank symbol is associated with the second space, wherein no stop position is associated with the second space;

a processor; and a memory device that stores a plurality of instructions, which when executed by the processor cause the processor to:

for an activation of the reel, cause the rotatable reel to rotate, select one of the stop positions to stop the reel, cause the reel to stop at the selected stop position, wherein the processor will only cause the reel to stop at stop positions associated with the symbols on the substrate and not at the first space or the second space.

14. The electronic gaming machine of claim 13, wherein the reel strip comprises:

a sixth non-blank symbol on the substrate, wherein an eight stop position is associated with the sixth non-blank symbol;

an enlarged seventh non-blank symbol on the substrate adjacent to the sixth non-blank symbol, wherein no blank symbol is between the sixth non-blank symbol on the substrate and the seventh non-blank symbol on the substrate, wherein a ninth stop position is associated with the seventh non-blank symbol; and an eighth non-blank symbol on the substrate adjacent to the seventh blank symbol, wherein no blank symbol is between the seventh non-blank symbol on the substrate and the eight non-blank symbol on the substrate, wherein a tenth stop position is associated with the eighth non-blank symbol.

15. The electronic gaming machine of claim 14, wherein the reel strip comprises:

a third space on the substrate between the sixth non-blank symbol on the substrate and the seventh non-blank symbol on the substrate adjacent, wherein no blank symbol is associated with the third space, wherein no stop position is associated with the third space; and a fourth space on the substrate between the seventh non-blank symbol on the substrate and the eighth non-blank symbol on the substrate adjacent, wherein no blank symbol is associated with the third space, wherein no stop position is associated with the fourth space.

16. The electronic gaming machine of claim 15, wherein the seventh non-blank symbol on the substrate and the fourth non-blank symbol are a same symbol.

17. The electronic gaming machine of claim 13, wherein the fourth non-blank symbol has a height that is greater than the height of each of the first non-blank symbol, the second non-blank symbol, the third non-blank symbol, and the fifth non-blank symbol.

18. The electronic gaming machine of claim 13, wherein a top of the fourth non-blank symbol is closer to the third non-blank symbol than a top of the second non-blank symbol is to the first non-blank symbol, and wherein a bottom of the fourth non-blank symbol is closer to the fifth third non-blank symbol than a bottom of the second non-blank symbol is to the third non-blank symbol.

19. The electronic gaming machine of claim 13, wherein the plurality of instructions, when executed by the processor cause the processor to not stop at the first space.

20. The electronic gaming machine of claim 19, wherein the plurality of instructions, when executed by the processor cause the processor to not stop at the second space.

* * * * *